United States Patent [19]
Mueller et al.

[11] Patent Number: 6,079,535
[45] Date of Patent: Jun. 27, 2000

[54] TRANSFER CASE WITH DISCONNECTABLE TRANSFER CLUTCH

[75] Inventors: Joseph G. Mueller, East Syracuse; Scott R. Moll, Waterloo, both of N.Y.

[73] Assignee: New Venture Gear, Inc., Troy, Mich.

[21] Appl. No.: 09/283,514

[22] Filed: Apr. 1, 1999

[51] Int. Cl.[7] .............................. B60K 23/08; F16D 21/08
[52] U.S. Cl. ...................... 192/48.2; 192/48.8; 192/53.1; 74/665 GE; 180/247
[58] Field of Search .................................. 192/48.2, 48.5, 192/48.7, 48.8, 53.1; 74/665 GE; 475/199, 204, 295, 320; 180/233, 247, 248, 249, 250

[56] References Cited

U.S. PATENT DOCUMENTS

| | | |
|---|---|---|
| 5,323,871 | 6/1994 | Wilson et al. . |
| 5,363,938 | 11/1994 | Wilson et al. . |
| 5,499,951 | 3/1996 | Showalter . |
| 5,584,776 | 12/1996 | Weilant et al. . |
| 5,597,369 | 1/1997 | Brissenden et al. ................. 180/247 X |
| 5,702,321 | 12/1997 | Bakowski et al. . |
| 5,725,453 | 3/1998 | Zalewski et al. . |

*Primary Examiner*—Richard M. Lorence
*Attorney, Agent, or Firm*—Harness, Dickey & Pierce, P.L.C.

[57] ABSTRACT

A transfer case having a primary output shaft, a secondary output shaft, and a transfer clutch disposed therebetween. The transfer clutch includes an inner drum journalled on the primary output shaft and which has clutch teeth that are selectively engageable with clutch teeth on the primary output shaft, an outer drum rotatably supported on the primary output shaft and which is fixed for rotation with the secondary output shaft, and a clutch pack operably interconnected between the inner and outer drums. The transfer clutch also includes an apply plate that is coupled for rotation with the primary output shaft and which is moveable for exerting a compressive clutch engagement force on the clutch pack, a primary spring which acts between the inner and outer drums for biasing the inner drum toward a "disconnect" position whereat its clutch teeth are disengaged from the clutch teeth on the primary output shaft, and a secondary spring which acts between the inner drum and the apply plate for biasing the apply plate toward a "released" position whereat it is disengaged from the clutch pack. The transfer case further includes a power-operated actuator assembly for causing movement of the apply plate, sensors for detecting vehicle conditions and generating sensor signals, a mode selector for permitting a vehicle operator to select a desired drive mode and generate a corresponding mode signal, and a controller for controlling actuation of the actuator assembly in response to the sensor and mode signals.

22 Claims, 4 Drawing Sheets

TRANSFER CASE WITH DISCONNECTABLE TRANSFER CLUTCH

BACKGROUND OF THE INVENTION

The present invention relates generally to four-wheel drive motor vehicles and, more particularly, to a transfer case equipped with a disconnectable clutch assembly.

In view of increased demand for four-wheel drive vehicles, a plethora of power transfer systems are currently being incorporated into vehicular drivetrain applications for transferring drive torque to all four wheels. In many vehicles, a transfer case is interconnected between the primary and secondary drivelines which is equipped with a dog-type mode clutch that can be selectively engaged for rigidly coupling the secondary driveline to the primary driveline to establish a part-time four-wheel drive mode. When the mode clutch is disengaged, all drive torque is delivered to the primary driveline for establishing a two-wheel drive mode.

A modern trend in four-wheel drive vehicles is to equip the transfer case with an electronically-controlled transfer clutch in place of the mode clutch. The transfer clutch is operable for automatically directing drive torque to the secondary wheels, without any input or action on the part of the vehicle operator, when traction is lost at the primary wheels for establishing an on-demand four-wheel drive mode. Typically, the transfer clutch is a multi-plate clutch assembly installed between the primary and secondary output shafts of the transfer case and which is actuated by a power-operated actuator in response to control signals sent from a controller. The control signals are based on current operating characteristics of the vehicle (i.e. vehicle speed, interaxle speed difference, steering angle, etc.) as detected by various sensors. Thus, such "on-demand" transfer cases can utilize adaptive control schemes for automatically controlling torque distribution during all types of driving and road conditions. In many instances, the vehicle operator is also permitted to select between the two-wheel drive mode and the part-time four-wheel drive mode in addition to the on-demand four-wheel drive mode. Specifically, when the two-wheel drive mode is selected, the clutch assembly is released for delivering all drive torque to the primary output shaft. In contrast, when the part-time four-wheel drive mode is selected, the clutch assembly is fully engaged for effectively locking the secondary output shaft to the primary output shaft. Examples of such four-wheel drive systems are disclosed in commonly owned U.S. Pat. Nos. 5,323,871, 5,363,938, 5,702,321 and 5,725,453.

While many on-demand clutch control systems similar to those described above are currently being used in four-wheel drive vehicles, a need exists to advance the technology and address recognized system limitations. For example, when the on-demand transfer cases is operating in its two-wheel drive mode, the viscous drag generated by relative rotation between the interleaved clutch plates of the clutch assembly causes the secondary output shaft to rotate which, in turn, results in efficiency losses and reduced fuel economy. This situation is particularly exacerbated during cold weather conditions when the viscosity of the fluid in the transfer case is relatively high. Thus, it would be desirable to equip an on-demand transfer case with a transfer clutch that eliminates or substantially reduces such efficiency losses due to clutch drag.

SUMMARY OF THE INVENTION

It is therefore an object of the present invention to provide a transfer case for use in a four-wheel drive vehicle having a transfer clutch installed between the primary and secondary output shafts and which can be selectively disconnected from the primary output shaft when the vehicle is operating in a two-wheel drive mode.

As a related object of the present invention, the transfer clutch can be selectively connected to the primary output shaft when it is desired to operate the vehicle in a four-wheel drive mode.

As a further related object of the present invention, the transfer clutch is operable in an on-demand four-wheel drive mode wherein the percentage drive torque delivered to the secondary output shaft is controlled in response to and as a function of relative rotation between the primary and secondary output shafts. Furthermore, the transfer clutch is operable in a part-time four-wheel drive mode to lock the secondary output shaft for common rotation with the primary output shaft.

Pursuant to yet another object of the present invention, the transfer clutch can be connected and disconnected during motive operation of the motor vehicle to permit on-the-fly shifting between the various drive modes.

According to a preferred embodiment, the transfer case of the present invention includes a primary output shaft, a secondary output shaft, and a transfer clutch disposed between the primary and secondary output shafts. The transfer clutch includes an inner drum journalled on the primary output shaft which has clutch teeth that are selectively engageable with clutch teeth on the primary output shaft, an outer drum rotatably supported on the primary output shaft and which is fixed for rotation with the secondary output shaft, and a clutch pack operably interconnected between the inner and outer drums. The clutch pack includes a set of inner clutch plates splined to the inner drum and a set of outer clutch plates splined to the outer drum which are alternately interleaved with the inner clutch plates. The transfer clutch also includes an apply plate that is coupled for rotation with the primary output shaft and which is moveable for exerting a compressive clutch engagement force on the clutch pack, a primary spring which acts between the inner and outer drums for biasing the inner drum toward a "disconnect" position whereat its clutch teeth are disengaged from the clutch teeth on the primary output shaft, and a secondary spring which acts between the inner drum and the apply plate for biasing the apply plate toward a "released" position whereat it is disengaged from the clutch pack. The transfer case further includes a power-operated actuator assembly for causing movement of the apply plate, sensors for detecting vehicle conditions and generating sensor signals, a mode selector for permitting a vehicle operator to select a desired drive mode and generate a corresponding mode signal, and a controller for controlling actuation of the actuator assembly in response to the sensor and mode signals.

When a two-wheel drive mode is selected, the primary spring biases the inner drum to its disconnect position and the secondary spring biases the apply plate to its released position, whereby the transfer clutch is disconnected from the primary output shaft. As such, all drive torque is delivered through the transfer case to the primary output shaft. However, when an on-demand four-wheel drive mode is selected, the actuator assembly causes the apply plate to move from its released position to a "ready" position for compressing the secondary spring and engaging the clutch pack. Concurrently, the primary spring maintains the inner drum in its disconnect position to provide a reaction force for compressing the clutch pack. As such, rotation of the apply plate causes the inner drum to rotate until its rotary speed is synchronous with that of the primary output shaft. Upon speed synchronization, the inner drum moves from its disconnect position to a "connect" position, in opposition to the biasing of the primary spring, whereat its clutch teeth mesh with the clutch teeth on the primary output shaft. Thus, movement of apply plates to its ready position acts to synchronize and then couple inner drum to the primary output shaft. Concurrent with movement of the inner drum to its connect position, the apply plate is retained in its ready position, thereby reducing the clutch engagement force exerted on the clutch pack and establishing a minimum torque distribution ratio between the primary and secondary output shafts. With the transfer clutch now connected to the primary output shaft, the controller modulates the actuated condition of the actuator assembly as a function of vehicle conditions detected by the sensors for moving the apply plate between its ready position and a "locked" position. In its locked position, the apply plate exerts a maximum clutch engagement force on the clutch pack for establishing a maximum torque distribution ratio between the primary and secondary output shafts. Thus, the torque distribution ratio can be automatically varied between its minimum and maximum values when the transfer case is operating in the ondemand four-wheel drive mode. Finally, when a part-time four-wheel drive mode is selected, the actuator assembly causes the apply plate to move to its locked position, whereby the transfer clutch is fully actuated for effectively locking the secondary output shaft to the primary output shaft.

Additional objects, features and advantages of the present invention will become apparent from studying the following detailed description and appended claims which, when taken in conjunction with the accompanying drawings, set forth the best mode now contemplated for carrying out this invention.

DETAILED DESCRIPTION OF THE PREFERRED EMBODIMENT

In general, the present invention relates to a transfer case for use in a four-wheel drive vehicle and which is equipped with a transfer clutch that can be selectively disconnected for reducing efficiency losses due to clutch drag. In particular, the transfer clutch can be selectively connected to, or disconnected from, a driven shaft in the transfer case. While the transfer clutch is shown hereinafter in association with a particular transfer case, it will be understood that the disconnectable clutch assembly of the present invention is adaptable for installation between any two relatively rotatable members for selectively transferring rotary power (i.e. drive torque) therebetween.

Figure 1:
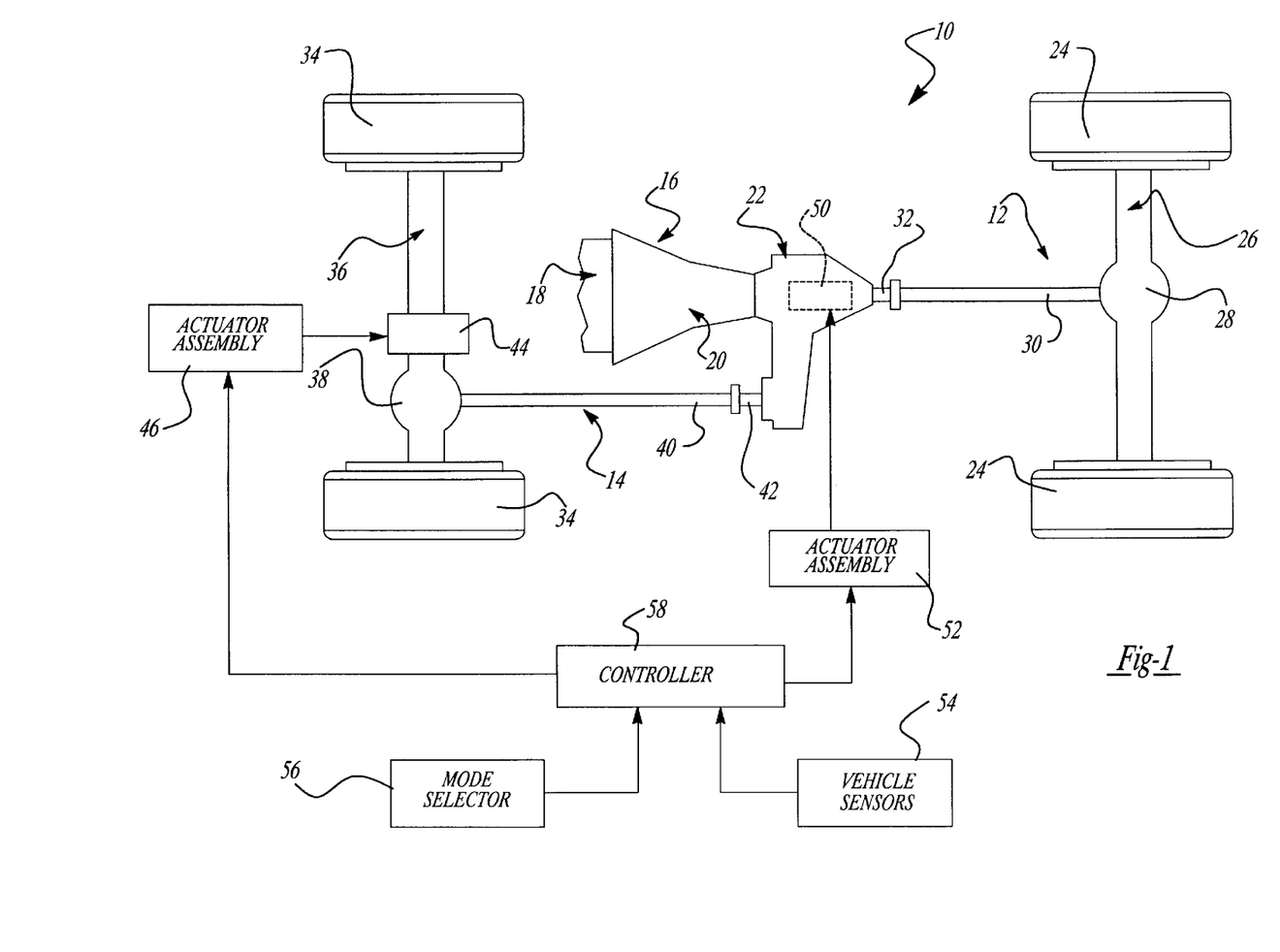
FIG. 1 illustrates an exemplary motor vehicle drivetrain that is equipped with the transfer case of the present invention.

With particular reference to FIG. 1 of the drawings, a drivetrain 10 for a four-wheel drive vehicle is shown. Drivetrain 10 includes a primary driveline 12, a secondary driveline 14, and a powertrain 16 for delivering rotary tractive power (i.e. drive torque) to the drivelines. In the particular arrangement shown, primary driveline 12 is the rear driveline while secondary driveline 14 is the front driveline. Powertrain 16 includes an engine 18, a multi-speed transmission 20, and a transfer case 22. Rear driveline 12 includes a pair of rear wheels 24 connected at opposite ends of a rear axle assembly 26 having a rear differential 28 coupled to one end of a rear prop shaft 30, the opposite end of which is coupled to a rear output shaft 32 of transfer case 22. Front driveline 14 includes a pair of front wheels 34 connected at opposite ends of a front axle assembly 36 having a front differential 38 coupled to one end of a front prop shaft 40, the opposite end of which is coupled to a front output shaft 42 of transfer case 22. In addition, front axle assembly 36 is equipped with an axle disconnect system which includes a disconnect clutch 44 and a power-operated actuator assembly 46. As is conventional, disconnect clutch 44 is operable in a "locked" mode for coupling front differential 38 to the remainder of front axle assembly 36 for delivering drive torque from front output shaft 42 to front wheels 34. Disconnect clutch 44 is also operable in a "released" mode for uncoupling front differential 38 from front axle assembly 36 such that front wheels 34 are disconnected from front output shaft 42. Actuator assembly 46 is provided for shifting disconnect clutch 44 between its locked and released modes. Alternatively, a wheel disconnect system of the type having a pair of disconnect clutches can be used for selectively connecting and disconnecting front wheel 34 relative to the axle shafts of front axle assembly 36. Several variations of such axle and wheel disconnect systems are currently used in four-wheel drive vehicles. In these applications, each disconnect clutch is shifted into the locked mode when the vehicle is operating in a four-wheel drive mode and is shifted into the released mode when the vehicle is operating in a two-wheel drive mode.

With continued reference to FIG. 1, drivetrain 10 is shown to further include an electronically-controlled power transfer system for permitting a vehicle operator to select between a two-wheel drive mode, a part-time four-wheel drive mode, and an on-demand four-wheel drive mode. In this regard, transfer case 22 is equipped with a transfer clutch 50 that is operable for transferring drive torque from rear output shaft 32 to front output shaft 42 for establishing the part-time and ondemand four-wheel drive modes. The power transfer system further includes a power-operated actuator assembly 52 for actuating transfer clutch 50, vehicle sensors 54 for detecting certain dynamic and operational characteristics of the motor vehicle, a mode selector 56 for permitting the vehicle operator to select one of the available drive modes, and a controller 58 for controlling actuation of actuator assemblies 46 and 52 in response to input signals from vehicle sensors 54 and mode selector 56.

In accordance with of the present invention, transfer clutch 50 can be selectively connected and disconnected relative to rear output shaft 32. As will be detailed, when mode selector 56 signals selection of the two-wheel drive mode, transfer clutch 50 is disconnected from rear output shaft 32 and disconnect cluch 44 is shifted into its released mode, whereby all drive torque is delivered by powertrain 16 to rear driveline 12. In contrast, when either of the part-time or on-demand four-wheel modes is selected, transfer clutch 50 is connected to rear output shaft 32 and disconnect clutch 44 is shifted into its locked mode, whereby transfer clutch 50 is operable to transfer drive torque to front output shaft 42 and front driveline 14.

Figure 2:
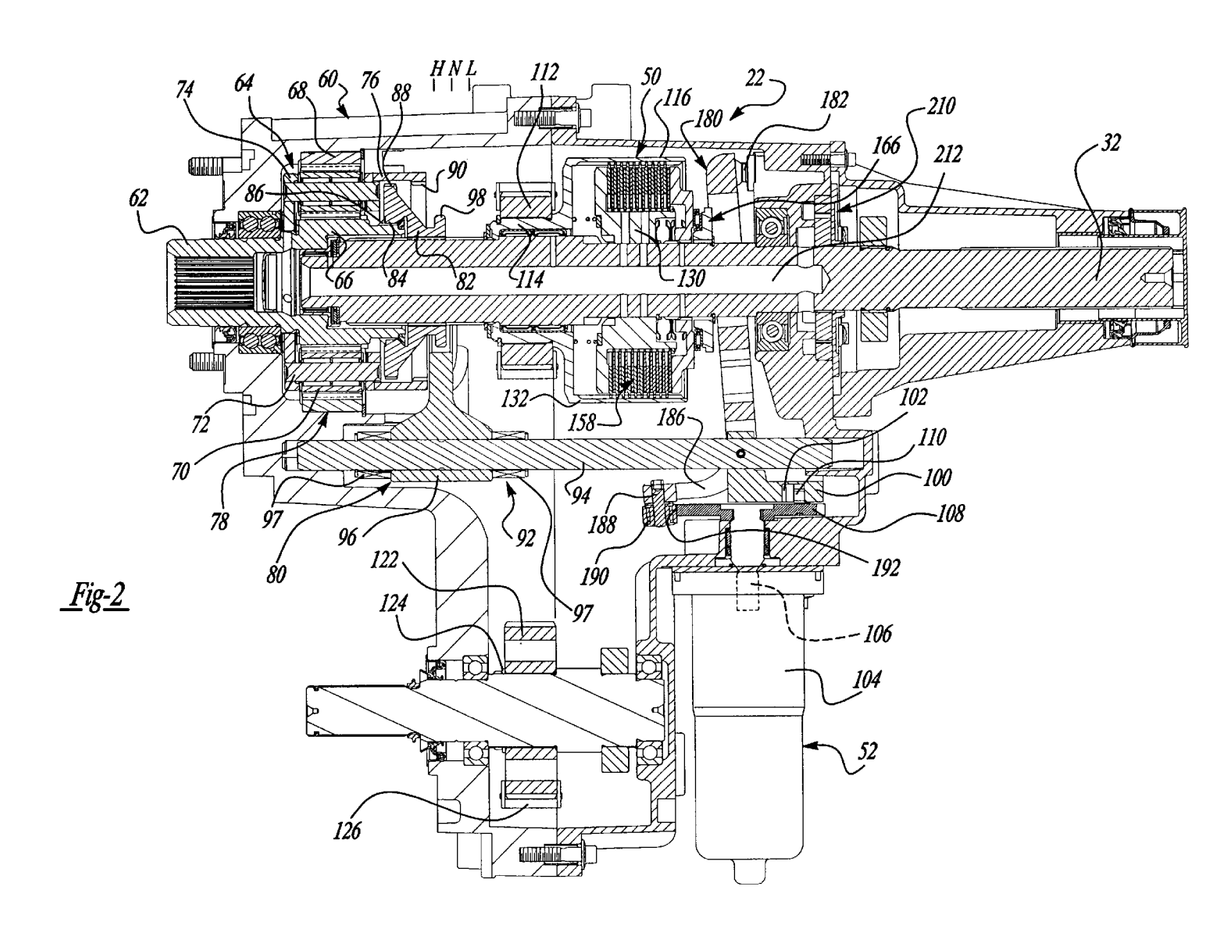
FIG. 2 is a sectional view of the transfer case equipped with a disconnectable transfer clutch and a clutch actuation system according to the present invention.
Figure 3:
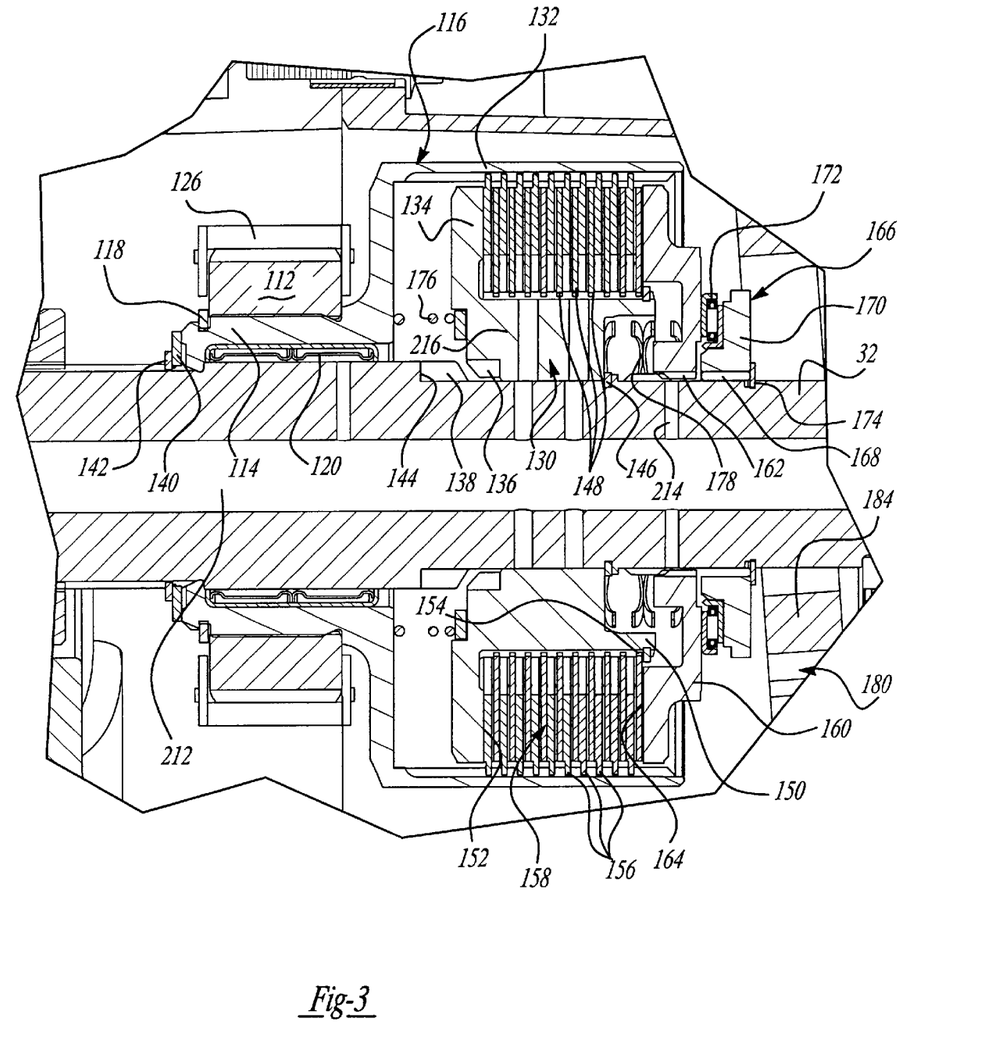
FIG. 3 is an enlarged partial view of FIG. 2 showing the components of the transfer clutch in greater detail.

Referring primarily to FIGS. 2 and 3, transfer case 22 is shown to include a housing assembly 60 adapted to be bolted to the housing of transmission 20. An input stub shaft 62 is rotatably supported by housing assembly 60 and is adapted for connection to the output shaft of transmission 20. As seen, rear output shaft 32 is rotatably supported between input shaft 62 and housing assembly 60 while front output shaft 42 is rotatably supported by housing assembly 60. Transfer case 22 is also shown to include a planetary gearset 64 comprised of a sun gear 66, a ring gear 68 fixed to housing assembly 60, and a set of pinion gears 70 meshed with sun gear 66 and ring gear 68. Each pinion gear 70 is rotatably supported on a pinion shaft 72 that extends between a front carrier plate 74 and a rear carrier plate 76 which are interconnected to define a planet carrier 78.

Gearset 64 functions as a gear reduction unit which, in conjunction with a range shift mechanism 80, is operable to establish one of a first drive connection between input shaft 62 and rear output shaft 32 or a second drive connection between planet carrier 78 and rear output shaft 32. Range shift mechanism 80 includes a range sleeve 82 that is splined for rotation with rear output shaft 32 and supported for bi-directional axial sliding movement thereon. To establish the first drive connection, range sleeve 82 is located in a high-range (H) position such that its internal clutch teeth 84 mesh with external clutch teeth 86 on input shaft 62, whereby rear output shaft 32 is directly driven by input shaft 62 to establish a high range drive mode. To establish the second drive connection, range sleeve 82 is located in a low-range (L) position such that its external clutch teeth 88 mesh with internal clutch teeth 90 formed on an annular extension of rear carrier plate 76, whereby rear output shaft 32 is driven by a planet carrier 78 at a reduced speed relative to input shaft 62 to establish a low-range drive mode. A Neutral non-driven mode is established when range sleeve 82 is located in a central neutral (N) position with its clutch teeth disconnected from corresponding clutch teeth on input shaft 62 and rear carrier plate 76, whereby no drive torque is transferred to rear output shaft 32.

Range shift mechanism 80 further includes a range fork assembly 92 comprised of a shift rail 94 supported from retention sockets formed in housing assembly 60, a range fork 96 that is fixed to shift rail 94, and a pair of centering springs 97. Range fork 96 includes a groove which entraps a lug 98 on range sleeve 82. Range fork assembly 92 also includes a range collar 100 that is pinned to shift rail 94 and which has a contoured range groove 102. To provide means for actuating range shift mechanism 80, power-operated actuator assembly 52 is shown to include an electrically-actuated rotary actuator 104 having a rotary output member 106, and a sector plate 108 fixed to output member 106. A range pin 110 fixed to sector plate 108 is retained in groove 102 of range collar 100. Thus, rotation of sector plate 108 in response to controlled actuation of rotary actuator 104 causes range pin 110 to engage an edge cam surface of range groove 102 which is contoured to cause corresponding axial movement of range fork assembly 92 for locating range sleeve 82 in the selected range position. In view of inclusion of gearset 64 and range shift mechanism 80 into transfer case 22, it is contemplated that mode selector 56 will permit selection of at least five different modes. These include a two-wheel high-range drive mode, the Neutral mode, part-time four-wheel high-range and low-range drive modes, and an on-demand four-wheel high-range drive mode.

With continued reference to FIGS. 2 and 3, means are shown for transferring drive torque from rear output shaft 32 to front output shaft 42 through transfer clutch 50. In particular, a drive sprocket 112 is splined to an axial hub segment 114 of an outer drum 116 that is associated with transfer clutch 50. A snap ring 118 axially locates and retains drive sprocket 112 on hub segment 114. Hub segment 114 is shown rotatably supported by a bearing assembly 120 on rear output shaft 32. In addition, a driven sprocket 122 is splined to front output shaft 42 and is axially retained thereon by a snap ring 124. A continuous power chain 126 is meshed with sprockets 112 and 122. Thus, rotation of outer drum 116 of transfer clutch 50 results in rotation of front output shaft 42.

Transfer clutch 50 is shown to be a mechanically-actuated multi-plate clutch assembly with an inner drum 130 journalled on rear output shaft 32 and which is located within a drum chamber defined by a drum segment 132 of outer drum 116. Inner drum 130 includes an integral reaction plate 134 and a set of internal clutch teeth 136 that are adapted to move into and out of meshed engagement with external clutch teeth 138 formed on rear output shaft 32 in response to axial sliding movement of inner drum 130 relative to outer drum 116. As seen, a thrust washer 140 and a snap ring 142 are provided at the terminal end of hub segment 114 of outer drum 116. The range of axial movement of inner drum 130 relative to outer drum 116 is limited by a stop shoulder 144 on rear output shaft 32 and a retaining ring 146 mounted in a groove in rear output shaft 32. Transfer clutch 50 also includes a set of inner clutch plates 148 that are splined for rotation with inner drum 130 and retained on a hub extension 150 between a face surface 152 of reaction plate 134 and a snap ring 154 mounted in a groove on hub extension 150. In addition, a set of outer clutch plates 156 are splined for rotation with drum segment 132 of outer drum 116 and are alternatively interleaved with inner clutch plates 148. Interleaved clutch plates 148 and 156 define a multi-plate friction-type clutch pack 158.

Transfer clutch 50 is further shown to include an apply plate 160 having a splined connection 162 with rear output shaft 32 and a face surface 164 that is adapted to move into and out of engagement with clutch pack 158 in response to axial movement of apply plate 160 relative to rear output shaft 32. A thrust bearing assembly 166 is provided for axially moving apply plate 160 to control the compressive clutch engagement force exerted on clutch pack 158. Thrust bearing assembly 166 includes a sleeve bushing 168 journalled on rear output shaft 32, a thrust plate 170 fixed to sleeve bushing 168, and a thrust bearing 172 retained between an inner face surface of thrust plate 170 and an outer face surface apply plate 160. A snap ring 174 axially locates bushing 168 and thrust plate 170 while acting to limit rearward movement thereof. Transfer clutch 50 further includes a primary spring 176 located within the drum chamber and which acts between inner drum 130 and outer drum 116 for biasing inner drum 130 toward the "disconnect" position shown in FIG. 3. With inner drum 130 located in its disconnect position, its clutch teeth 136 are disengaged from clutch teeth 138 on rear output shaft 32. Transfer clutch 50 also includes a secondary spring 178 which acts between inner drum 130 and apply plate 160 for biasing apply plate 160 toward the "released" position shown in FIG. 3. With apply plate 160 located in its released position, it is disengaged from engagement with clutch pack 158.

In addition to controlling movement of range fork assembly 92, rotation of sector plate 108 also functions to control the axial position of apply plate 160 relative to clutch pack 158. To change the rotary movement of sector plate 108 into axial movement of apply plate 160, a lever arm 180 is pivotably mounted to housing assembly 60, such as by a ball joint 182, and has bifurcated rails 184 which act on thrust plate 170. A flanged end 186 of lever arm 180 has a pin 188 secured thereto on which a roller 190 is supported. Roller 190 engages a profiled edge, hereinafter referred to as mode cam surface 192, of sector plate 108 such that controlled rotation of sector plate 108 results in corresponding pivotal movement of lever arm 180, thereby controlling axial movement of thrust plate 170 and apply plate 160. Preferably, rotary actuator 104 is a gearmotor/encoder assembly which receives electrical control signals from controller 58 for controlling the direction and magnitude of rotary motion of output member 106.

Figure 4:
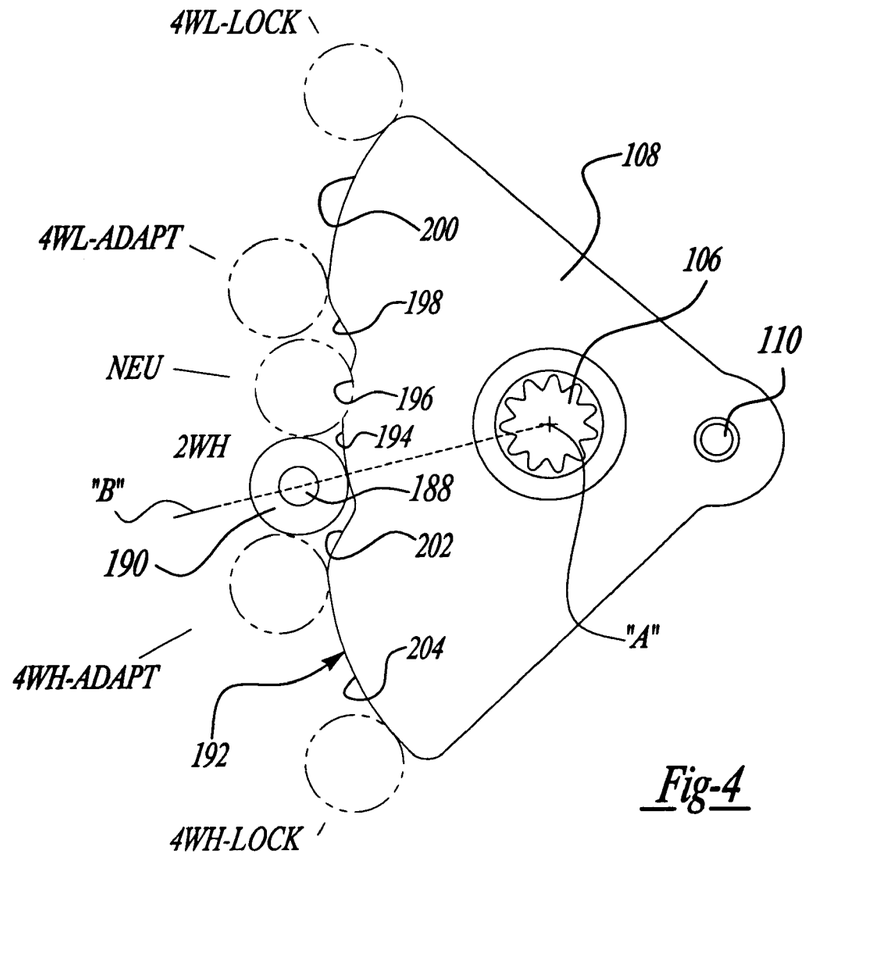
FIG. 4 is a side view of the sector plate associated with the clutch actuation system of the transfer case.

With particular reference now to FIG. 4, sector plate 108 is shown to define six distinct sector positions as labeled "4WL-LOCK", "4WL-ADAPT", "NEU", "2WH", "4WH-ADAPT", and "4WH-LOCK". In particular, rotation of sector plate 108 about axis "A" functions to move roller 190 along a line of action "B" due to the profile of cam surface 192, thereby causing pivotal movement of lever arm 180. Such rotation of sector plate 108 also causes coordinated movement of range fork assembly 92 due to engagement of range pin 110 with the edge cam surface of range groove 102.

When the two-wheel high-range drive mode is selected, mode selector 56 sends the appropriate mode signal to controller 58 which, in turn, sends an electrical signal to rotary actuator 104 for causing sector plate 108 to be rotated to its 2WH position. Such rotation of sector plate 108 to its 2WH position causes range pin 110 to bear against the cam surface of range groove 102 for axially locating range sleeve 82 in its H position. Such rotation also causes roller 190 to engage a first edge segment 194 of mode cam surface 192 which pivotably positions lever arm 180 so as to allow secondary spring 178 to bias apply plate 160 into its released position which, in turn, allows primary spring 176 to bias inner drum 130 to its disconnect position. As shown in FIG. 3, transfer clutch 50 is disconnected from rear output shaft 32 and no drive torque is transferred to outer drum 116. With transfer clutch 50 disconnected, clutch pack 158 is uncoupled from driven connection with rear output shaft 32 such that no relative rotation between inner drum 130 and outer drum 116 occurs due to viscous drag between the interleaved clutch plates. In addition, controller 58 sends a signal to actuator assembly 46 for shifting disconnect clutch 44 into its released mode. Thus, when the two-wheel high-range drive mode is selected, all drive torque is delivered to rear driveline 12 from rear output shaft 32.

If the Neutral mode is then selected, controller 58 sends the appropriate electrical signal to actuator 104 for rotating sector plate 108 from its 2WH position to its NEU position. Such rotation causes range pin 102 to engage the edge cam surface of range groove 102 in collar 100 for moving range sleeve 82 to its N position. Concurrently, this rotation of sector plate 108 causes roller 190 to ride along first edge segment 194 of mode cam surface 192 until it is seated in a recessed detent 196. With roller 190 seated in detent 196, apply plate 160 is maintained in its released position. Thus, gearset 64 and transfer clutch 50 are both disconnected from rear output shaft 32 such that no drive torque is transferred through transfer case 22 to either driveline. Furthermore, disconnect clutch 44 is maintained in its released mode.

Thereafter, if the part-time four-wheel low-range drive mode is selected, sector plate 108 is rotated by actuator 104 from its NEU position to its 4WL-LOCK position. Such rotation causes roller 190 to move out of detent 196 and initially engage a second edge segment 198 of mode cam surface 192. The profile of second edge segment 198 causes pivotal movement of lever arm 180 which, in turn, causes apply plate 160 to move from its released position into a position of engagement with clutch pack 158. This axial movement of apply plate 160 causes secondary spring 178 to compress while primary spring 176 acts to maintain inner drum 130 in its disconnect position. Since apply plate 160 is splined for rotation with rear output shaft 32, such engagement with clutch pack 158 acts to compress clutch pack 158 against reaction flange 134, thereby causing rotation of both inner drum 130 and outer drum 116. Once sector plate 108 has rotated to the intermediate 4WL-ADAPT position, roller 190 is at the intersection of second edge segment 198 and a third edge segment 200. At this point, the rotary speed of inner drum 130 has accelerated to be synchronous with that of rear output shaft 32. As such, inner drum 130 moves to its connect position while compressing primary spring 176, whereby its clutch teeth 136 are meshed with clutch teeth 138 on rear output shaft 32 for coupling inner drum 130 for common rotation with rear output shaft 32. Thus, second edge segment 198 acts as a synchronization ramp surface for synchronizing and subsequently coupling inner drum 130 to rear output shaft 32. Continued rotation of sector plate 108 from its 4WL-ADAPT position toward its 4WL-LOCK position causes roller 190 to ride against third edge segment 200. The profile of third edge segment 200 causes additional pivotal movement of lever arm 180 which, in turn, results in continued axial movement of apply plate 160, clutch pack 158 and inner drum 130. With sector plate 108 in its 4WL-LOCK position, inner drum 130 abuts stop shoulder 144 to prevent further axial movement thereof relative to outer drum 116. In addition, clutch pack 158 is fully compressed for locking outer drum 116 to inner drum 130, whereby transfer clutch 50 is fully engaged to establish the part-time four-wheel drive mode.

Concurrent with the connection and full engagement of transfer clutch 50, rotation of sector plate 108 from its NEU position to its 4WL-LOCK position causes range pin 110 to engage the cam edge surface of groove 102 in range collar 100 for moving range sleeve 82 from its N position into its L position. In addition, controller 58 actuates actuator assembly 46 for shifting disconnect clutch 44 into its locked mode upon mode selector 56 signaling selection of the part-time four-wheel low-range drive mode. Subsequent shifting of transfer case 22 into either of the Neutral and two-wheel high-range drive modes causes opposite rotation of sector plate 108 for permitting apply plate 160 to move back to its released position where primary spring 176 is able to urge inner drum 130 to move from its connect position to its disconnect position for disconnecting transfer clutch 50. While not typically used, an on-demand four-wheel low-range drive mode is available for modulating the torque transferred across transfer clutch 50 by controlling the location of sector plate 108 between its 4WL-ADAPT and 4WL-LOCK positions. A control scheme similar to that disclosed hereinafter for the on-demand four-wheel high-range drive mode can be used to variably control on-demand low-range actuation of transfer clutch 50 if such a drive mode is made available.

When the vehicle operator actuates mode selector 56 to shift from the two-wheel high-range drive mode into the on-demand four-wheel high-range drive mode, rotary actuator 104 is actuated by controller 58 for rotating sector plate 108 from its 2WH position to its 4WH-ADAPT position. Such rotation causes roller 190 to disengage first edge segment 194 and bear against a fourth edge segment 202 of mode cam surface 192. The profile of fourth edge segment 202 cause pivotal movement of lever arm 180 for moving apply plate 160 from its released position to a "ready" position. Such movement of apply plate 160 to its ready position causes secondary spring 178 to compress while primary spring 176 maintains inner drum 130 in its disconnect position. In addition, apply plate 160 compresses clutch pack 158 against reaction flange 134 for causing inner drum 130 and outer drum 116 to rotate with apply plate 160. Once the speed of inner drum 130 is synchronous with that of rear output shaft 32, inner drum 130 moves to its connect position with its clutch teeth 136 meshed with clutch teeth 138 on rear output shaft 32. Thus, fourth edge segment 202 acts as a synchronization ramp surface for synchronizing and then coupling transfer clutch 50 to rear output shaft 32. Moreover, this axial movement of inner drum 130 to its connect position while apply plate 160 is maintained in its ready position acts to release the compressive clutch engagement force exerted on clutch pack 158 such that a predetermined minimum torque distribution ratio is established between rear output shaft 32 and front output shaft 42. Thereafter, controller 58 sends a signal to actuator assembly 46 for shifting disconnect clutch 44 into its locked mode. Furthermore, the profile of range groove 100 is such that rotation of sector plate 108 between its 2WH and 4WH-ADAPT positions acts to maintain range sleeve 82 in its H position.

With transfer clutch 50 connected and transfer case 22 operating in its on-demand four-wheel high-range drive mode, controller 58 automatically controls the amount of drive torque transferred to front output shaft 42 by controlling bi-directional rotation of sector plate 108 between its 4WH-ADAPT and 4WH-LOCK positions. Such rotation of sector plate 108 causes roller 190 to ride along a fifth edge segment 204 of mode cam surface 198. The profile of fifth edge segment 204 causes pivotal movement of lever arm 180 for moving apply plate 160 between its ready position and a "locked" position. With sector plate 108 in its 4WH-ADAPT position, apply plate 160 is in its ready position and a predetermined minimum percentage of drive torque is transferred from rear output shaft 32 to front output shaft 42. Preferably, the minimum percentage of drive torque transferred through transfer clutch 50 to front output shaft 42 is in the range of, for example, about three to ten percent so as to take up any backlash by preloading front driveline 14 in preparation for high-speed on-demand control of transfer clutch 50. In contrast, with sector plate 108 in its 4WH-LOCK position, apply plate 160 is in its locked position with inner drum 130 seated against shoulder 144 and clutch pack 158 fully compressed such that a maximum percentage of drive torque is transferred to front output shaft 42. The maximum percentage of drive torque available for transfer to front output shaft 42 is fifty percent. The profile of range groove 100 is such that rotation of sector plate 108 between its 4WH-ADAPT and 4WH-LOCK position acts to maintain range sleeve 82 in its H position.

Preferably, vehicle sensors 54 include a rear output shaft speed sensor and a front output shaft speed sensor. When transfer case 22 is operating in the on-demand drive mode, controller 58 calculates the speed difference between output shafts 32 and 42 from the sensor signals supplied by the speed sensors. Based on the magnitude of the speed difference, controller 58 sends control signals to rotary actuator 104 for controlling the rotated position of sector plate 108 between its 4WH-ADAPT and 4WH-LOCK positions for adaptively controlling relative rotation (i.e., slip) between output shafts 32 and 42. It should be understood that any known clutch control schemes for automatically and adaptively controlling torque distribution across a modulatable clutch assembly can be used with transfer clutch 50 based on signals supplied by additional sensors (i.e. acceleration, steering angle, braking, engine torque, etc.) cumulative defined by vehicle sensors 54.

When the part time four-wheel high-range drive mode is selected, sector plate 108 is rotated to its 4WH-LOCK position which, as previously noted, causes roller 190 to bear against fifth edge segment 204 for pivoting lever arm 180 to move apply plate 160 to its lock position where a maximum clutch engagement force is exerted on clutch pack 158, thereby locking front output shaft 42 for common rotation with rear output shaft 32. Preferably, actuator assembly 52 is equipped with a brake unit that can be actuated to engage output member 106 of actuator 104 for holding sector plate 108 in one of its 4WL-LOCK and 4WH-LOCK positions when the corresponding part-time four-wheel low-range or high-range drive mode is selected. The brake unit functions to minimize the on-time service requirements of actuator 104 required to maintain transfer clutch 50 in a fully-engaged condition. To provide lubrication, transfer case 22 is equipped with a shaft-driven lube pump 210 which supplies fluid from a sump within housing assembly 60 to a central channel 212 in rear output shaft. Lubricant is delivered to components and surfaces requiring lubrication via a series of radial ports 214. As seen, radial ports 216 in inner drum 130 permit lubricant to cool clutch pack 158.

The foregoing discussion discloses and describes a preferred embodiment of the present invention. However, transfer clutch 50 could be used in single-speed transfer cases in which gearset 64 and range shift mechanism 80 are eliminated. Moreover, it is contemplated that movement of apply plate 160 could be accomplished using alternatives to the lever arm sector plate arrangement shown. For example, a hydraulic control valve under the control of controller 58 could be used to regulate the fluid pressure delivered to a pressure chamber for controlling movement of a piston relative to apply plate 160 or clutch pack 158. As a further alternative, an electromagnetic actuator could control actuation of a ball ramp operator to control movement of apply plate 160. Thus, those skilled in the art will readily recognize that such variations, modifications and/or alternatives are contemplated equivalents to the particular embodiment disclosed and can be made without departing from the true spirit and fair scope of the invention defined by the following claims.

What is claimed is:

1. A transfer case for use in motor vehicles for transferring drive torque from a powertrain to first and second drivelines, said transfer case comprising:

a first output shaft adapted to transmit drive torque from the powertrain to the first driveline;

a second output shaft adapted to transmit drive torque to the second driveline;

a transfer clutch for transferring drive torque from said first output shaft to said second output shaft, said transfer clutch including a first clutch member supported on said first output shaft, a second clutch member coupled for rotation with said second output shaft, and a clutch pack having a first plate coupled for rotation with said first clutch member and a second plate coupled for rotation with said second clutch member, said transfer clutch further including an apply plate coupled for rotation with said first output shaft and sliding movement relative thereto, and a spring acting between said first and second clutch members; and an actuator for moving said apply plate to establish one of a two-wheel drive mode and a four-wheel drive mode, said actuator is operable to locate said apply plate in a first position disengaged from said clutch pack such that said spring biases said first clutch member to a disconnect position whereat said first clutch plate is uncoupled from said first output shaft for establishing said two-wheel drive mode, and said actuator is operable to locate said apply plate in a second position engaged with said clutch pack such that said first clutch member is located in a connect position whereat said first clutch member is coupled for rotation with said first output shaft for establishing said four-wheel drive mode.

2. The transfer case of claim 1 wherein said first clutch member includes clutch teeth that are released from meshed engagement with clutch teeth on said first output shaft when said first clutch member is in said disconnect position, and wherein said clutch teeth on said first clutch member are meshed with said clutch teeth on said first output shaft when said first clutch member is in said connect position.

3. The transfer case of claim 2 further comprising a second spring acting between said first clutch member and said apply plate for urging said apply plate toward its first position when said first clutch member is in its disconnect position, and said second spring is compressed in response to movement of said apply plate from its first position to its second position for assisting in urging said first clutch plate to move to its connect position.

4. The transfer case of claim 3 wherein movement of said apply plate from its first position to its second position exerts a clutch engagement force on said clutch pack for causing rotation of said first and second clutch members due to rotation of said apply plate with said first output shaft, and wherein said first clutch member moves from its disconnect position to its connect position in opposition to the biasing of said first spring when the rotary speed of said first clutch member is synchronous with the rotary speed of said first output shaft.

5. The transfer case of claim 4 wherein movement of said apply plate to its second position causes a predetermined minimum clutch engagement force to be exerted on said clutch pack for transferring a minimum percentage of drive torque through said clutch pack to said second clutch member and said second output shaft.

6. The transfer case of claim 5 wherein said actuator is further operable to move said apply plate from its second position to a third position for causing a predetermined maximum clutch engagement force to be exerted on said clutch pack for transferring a maximum percentage of drive torque through said clutch pack to said second clutch member and said second output shaft.

7. The transfer case of claim 6 further comprising:
a mode selector permitting selection of said two-wheel drive mode, an on-demand four-wheel drive mode, and a part-time four-wheel drive mode; and
a controller for controlling actuation of said actuator to establish the selected drive mode, said controller is operable for causing said actuator to locate said apply plate in its first position when said two-wheel drive mode is selected, said controller is operable for causing said actuator to initially locate said apply plate in its second position and then modulate the position of said apply plate between its second and third positions when said on-demand four-wheel drive mode is selected, and said controller causes said actuator to move said apply plate to its third position when said part-time four-wheel drive mode is selected.

8. The transfer case of claim 7 further comprising sensors for detecting vehicular operating characteristics and sending sensor signals to said controller, said controller operable to modulate the position of said apply plate between its second and third positions in response to and as a function of said sensor signals during operation in said on-demand four-wheel drive mode.

9. The transfer case of claim 1 wherein said apply plate is splined to said first output shaft, wherein said actuator is a power-operated device having a movable output member, and further comprising a clutch actuation mechanism for causing coordinated sliding movement of said apply plate in response to movement of said output member.

10. The transfer case of claim 1 further comprising:
an input shaft driven by the powertrain;
a gear reduction unit driven by said input shaft at a reduced speed; and
a range shift mechanism operable in a first position to establish a drive connection between said input shaft and said first output shaft to define a high-range drive mode, said range shift mechanism is further operable in a second position to establish a drive connection between said gear reduction unit and said first input shaft to define a low-range drive mode.

11. The transfer case of claim 10 wherein said actuator is operable for controlling coordinated movement of said range shift mechanism and said apply plate.

12. The transfer case of claim 2 wherein said first clutch member is an inner drum journally supported on said first output shaft with internal clutch teeth selectively engageable with external clutch teeth on said first output shaft, wherein said second clutch member is an outer drum defining a drum chamber in which said inner drum is located, wherein said clutch pack includes a set of first plates splined to said inner drum and a set of second plates splined to said outer drum, wherein said apply plate is splined for rotation with said first output shaft and sliding movement related thereto, and wherein movement of said apply plate from its first position to its second position causes said clutch pack to be compressed against a reaction flange on said inner drum and causes initial sliding movement of said inner drum toward its connect position until its internal clutch teeth move into abutting non-meshed engagement with said external clutch teeth on said first output shaft, subsequent synchronization of the rotary speed of said inner drum and said first output shaft permits said internal clutch teeth on said inner drum to move into meshed engagement with said external clutch teeth on said first output shaft.

13. A clutch assembly for transferring rotary power from a first shaft to a second shaft, comprising:
a first clutch member adapted to be supported on the first shaft;
a second clutch member adapted to be coupled for rotation with the second shaft;
a clutch pack having a first plate coupled for rotation with said first clutch member and a second plate coupled for rotation with said second clutch member;
an apply plate adapted to be coupled for rotation with the first shaft and sliding movement relative thereto;
a spring acting between said first and second clutch members; and
an actuator for moving said apply plate to establish one of a first drive mode and a second drive mode, said actuator is operable to locate said apply plate in a first position disengaged from said clutch pack such that said spring biases said first clutch member to a disconnect position whereat said first clutch plate is uncoupled from the first shaft for establishing said first drive mode, and said actuator is operable to locate said apply plate in a second position engaged with said clutch pack such that said first clutch member is located in a connect position whereat said first clutch member is coupled for rotation with the first shaft for establishing said second drive mode.

14. The clutch assembly of claim 13 wherein said first clutch member includes clutch teeth that are released from meshed engagement with clutch teeth on said first shaft when said first clutch member is in said disconnect position, and wherein said clutch teeth on said first clutch member are meshed with said clutch teeth on said first shaft when said first clutch member is in said connect position.

15. The clutch assembly of claim 14 further comprising a second spring acting between said first clutch member and said apply plate for urging said apply plate toward its first position when said first clutch member is in its disconnect position, and said second spring is compressed in response to movement of said apply plate from its first position to its second position for assisting in urging said first clutch plate to move to its connect position.

16. The clutch assembly of claim 15 wherein movement of said apply plate from its first position to its second position exerts a clutch engagement force on said clutch pack for causing rotation of said first and second clutch members due to rotation of said apply plate with said first shaft, whereby said first clutch member moves from its disconnect position to its connect position in opposition to the biasing of said first spring when the rotary speed of said first clutch member is synchronous with the rotary speed of said first shaft.

17. The clutch assembly of claim 16 wherein movement of said apply plate to its second position causes a predetermined minimum clutch engagement force to be exerted on said clutch pack for transferring a minimum percentage of drive torque through said clutch pack to said second clutch member and said second shaft.

18. The clutch assembly of claim 17 wherein said actuator is further operable to move said apply plate from its second position to a third position for causing a predetermined maximum clutch engagement force to be exerted on said clutch pack for transferring a maximum percentage of drive torque through said clutch pack to said second clutch member and said second shaft.

19. The clutch assembly of claim 18 wherein said first and second shafts are first and second output shafts of a transfer case having a mode selector permitting selection of a two-wheel drive mode, an on-demand four-wheel drive mode, and a part-time four-wheel drive mode, and a controller for controlling actuation of said actuator to establish the selected drive mode, said controller is operable for causing said actuator to locate said apply plate in its first position when said two-wheel drive mode is selected, said controller is operable for causing said actuator to initially locate said apply plate in its second position and then modulate the position of said apply plate between its second and third positions when said on-demand four-wheel drive mode is selected, and said controller causes said actuator to move said apply plate to its third position when said part-time four-wheel drive mode is selected.

20. The clutch assembly of claim 19 further comprising sensors for detecting a speed difference between said first and second output shafts and sending sensor signals to said controller, said controller operable to modulate the position of said apply plate between its second and third positions in response to and as a function of said sensor signals during operation in said on-demand four-wheel drive mode.

21. The clutch assembly of claim 20 wherein said apply plate is splined to said first output shaft, wherein said actuator is a power-operated device having a movable output member, and further comprising a clutch actuation mechanism for causing coordinated sliding movement of said apply plate in response to movement of said output member.

22. The clutch assembly of claim 13 wherein said first clutch member is an inner drum journally supported on said first shaft with internal clutch teeth selectively engageable with external clutch teeth on said first shaft, wherein said second clutch member is an outer drum defining a drum chamber in which said inner drum is located, wherein said clutch pack includes a set of first plates splined to said inner drum and a set of second plates splined to said outer drum, wherein said apply plate is splined for rotation with said first output shaft and sliding movement related thereto, and wherein movement of said apply plate from its first position to its second position causes said clutch pack to be compressed against a reaction flange on said inner drum and causes initial sliding movement of said inner drum toward its connect position until its internal clutch teeth move into abutting non-meshed engagement with said external clutch teeth on said first shaft, subsequent synchronization of the rotary speed of said inner drum and said first shaft permits said internal clutch teeth on said inner drum to move into meshed engagement with said external clutch teeth on said first shaft.

* * * * *